(12) United States Patent
Cooke (10) Patent No.: US 10,639,507 B2
(45) Date of Patent: May 5, 2020

(54) FIRE COLLAR

(71) Applicant: Arlenko Pty Ltd, Thornlands (AU)

(72) Inventor: Richard Cooke, Thornlands (AU)

(73) Assignee: Arlenko Pty Ltd, Thornlands (AU)

( * ) Notice: Subject to any disclaimer, the term of this patent is extended or adjusted under 35 U.S.C. 154(b) by 237 days.

(21) Appl. No.: 15/749,990

(22) PCT Filed: Aug. 2, 2016

(86) PCT No.: PCT/AU2016/050695
§ 371 (c)(1),
(2) Date: Feb. 2, 2018

(87) PCT Pub. No.: WO2017/020078
PCT Pub. Date: Feb. 9, 2017

(65) Prior Publication Data
US 2018/0236280 A1    Aug. 23, 2018

(30) Foreign Application Priority Data

Aug. 3, 2015   (AU) ................................. 2015903073
Aug. 28, 2015  (AU) ................................. 2015903489

(51) Int. Cl.
*A62C 2/18*     (2006.01)
*A62C 2/14*     (2006.01)
*F16L 5/04*     (2006.01)
*H02G 3/04*     (2006.01)
*A62C 2/06*     (2006.01)

(52) U.S. Cl.
CPC ............... *A62C 2/14* (2013.01); *F16L 5/04* (2013.01); *H02G 3/0412* (2013.01); *A62C 2/065* (2013.01)

(58) Field of Classification Search
CPC ........................................................ A62C 2/14
USPC ..................... 454/357, 257, 365; 137/72–75; 126/287.5; 49/7, 1
See application file for complete search history.

(56) References Cited

U.S. PATENT DOCUMENTS 3,076,469 A * 2/1963 Averill ..................... A62C 2/14
                                                        137/74
3,678,634 A   7/1972 Wise et al.
4,136,707 A * 1/1979 Gaillot ................... A62C 2/065
                                                        137/360

FOREIGN PATENT DOCUMENTS

| CH | 675211 A5    | 9/1990  |
| DE | 8317709 U1   | 10/1984 |
| JP | 2009084848 A | 4/2009  |

* cited by examiner

*Primary Examiner* — Vivek K Shirsat
(74) *Attorney, Agent, or Firm* — Benjamin Aaron Adler (57) ABSTRACT

There is provided a fire collar comprising a casing defining a service conduit passage therethrough, the casing having an activation side and an installation side, wherein the casing defines an activation side located activation chamber. The fire collar has an opposing pair of shutters located within the activation chamber defining operative leading edges. In use, the shutters are configurable in a non-activated configuration wherein the leading edges are spaced apart so as to make allowance for the service conduit therebetween and when the fire collar is exposed to heat on the activation side in use, the shutters transition to an activated configuration wherein the respective leading edges of the shutters close in the passage.

26 Claims, 8 Drawing Sheets

FIRE COLLAR

FIELD OF THE INVENTION

The present invention relates to building apparatus and in particular to a fire collar for fire containment.

BACKGROUND OF THE INVENTION

Passive fire protection is the concept of using the building elements to contain a fire to prevent the rapid spread of the fire, to allow for evacuation of occupants and to provide safer conditions for fire fighting.

Buildings are designed to have separate "fire compartments" wherein walls, floors, ceilings, doors etc. (building elements) are designed and rated to have a fire resistance level or FRL.

The FRL varies according to the type of building. For example, apartments may have a FRL of 90 minutes whereas old age homes may have a FRL of 240 minutes.

Services conduits including conduits for water, electricity, sewage, air-conditioning and ventilation have to penetrate these fire compartments and the holes required for their passage have to be protected.

Certain conduits such as plastic conduits melt very quickly and it is therefore essential to have an efficient means to seal these penetrations.

Such is achieved by the use of "fire collars" at these conduit passages capable of maintaining the FRL of the building element. Specifically, a fire collar is a device that reacts to heat to seal the conduit passage and eliminate or reduce the heat transfer to the adjacent fire compartment space.

The present invention seeks to provide a fire collar, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

According to one aspect, there is provided a fire collar comprising: a casing defining a service conduit passage therethrough, the casing having an activation side and an installation side, wherein the casing defines an activation side located activation chamber; an opposing pair of shutters located within the activation chamber defining operative leading edges such that, in use: the shutters are configurable in a non-activated configuration wherein the leading edges are spaced apart so as to make allowance for the service conduit therebetween; and when the fire collar is exposed to heat on the activation side, the shutters transition to an activated configuration wherein the respective leading edges of the shutters close in to close the passage, wherein: the activation chamber defines an open ended entrance allowing allow for spacing around the periphery of the service conduit located within the activation chamber such that, when the fire collar is exposed to heat on the activation side, a substantial portion of the periphery of the service conduit located within the activation chamber is exposed to the heat.

The space allowed for by the open-ended activation chamber allows the service conduit to be exposed to heat so as to degrade more quickly during the event of a fire as opposed to were the periphery of the service conduit insulated in some manner. For example, were the periphery of the service conduit covered by surrounding building material or a fire collar, the surrounding building material or the fire collar may insulated the periphery of the service conduit from heat or wick heat therefrom potentially allowing fire to travel through the service conduit for some time prior to the activation of the fire collar.

The shutters may be pivotally coupled to the casing at pivot points and wherein the shutters may be orientated with the pivot points towards the installation side and the leading edges towards the activation side.

The closing of the shutters against the service conduit at the entrance of the activation chamber as opposed to towards the installation side prevents or ameliorates problems wherein surrounding concrete at the installation side wicks heat from the service conduit resulting in the slower degradation thereof and therefore delayed activation of the fire collar.

The fire collar may further comprise intumescent material located within the activation chamber, such that, when the fire collar may be exposed to heat on the activation side, the intumescent material forms activated intumescent material and wherein the activated intumescent material collects on top of the shutters in the activated configuration.

The intumescent material may comprise a pair of intumescent material pads fastened to respective inner surfaces of the shutters.

The shutters define central portions and inwardly projecting wings engaging pivot points such that, in the activated configuration, the central portions cradle the activated intumescent material.

The configuration of the shutters therefore cradles the activated intumescent material allowing the activated intumescent material to rest atop the shutters so as to prevent or substantially ameliorate the potential for the activated intumescent material to fall from the fire collar. Furthermore, the configuration of the shutters prevents or ameliorates the activated intumescent material from being drafted up the service conduit by convection currents.

The central portions may have planar mid portions.

The projecting wings may be substantially perpendicular to the mid portions.

The central portions may have leading edge portions.

The leading edge portions transition inwardly.

The inward transition of the leading edge strengthens the leading edge thereby preventing or ameliorating the "banana effect" wherein non-strengthened leading edges splay apart when pressing against the service conduit.

The central portions may have trailing edge portions.

The leading trailing portions transition inwardly.

The inward transition of the trailing edge portion allows the trailing edge portion to transition past the inner wall of the activation chamber when the shutters pivot to the activated configuration. The inward transition of the trailing edge portion may also strengthen the trailing edge portion.

The inwardly projecting wings may engage the pivot points such that the pivot points are closer to the trailing portions as opposed to the leading edge portions.

The activation chamber defines a height and the central portions may be configured, such that, in the non-activated configuration, the central portions occupy most of the height.

Such a configuration allows for a compact construction wherein the shutters are able to utilise most of the interior space of the activation chamber.

The activation chamber defines a rectangular cross-section and wherein the projecting wings lie against first opposing inner surfaces of the activation chamber and wherein, in the non-activated configuration, the mid portions lie against second opposing inner surfaces of the activation chamber.

The rectangular cross-section of the casing assists in the installation thereof wherein, for example, formwork flooring may be cut utilising straightedge cutters such as angle grinders.

The fire collar may further comprise shutter biasing means to bias the shutters to the activated configuration.

The biasing means may comprise at least one tension spring tensioned between the shutters.

The shutters define a central portions and inwardly projecting wings and wherein the at least one tension spring may comprise two tension springs engaging the shutters at respective junctures between the central portions and inwardly projecting wings.

The at least tension spring may be located inward of the inwardly projecting wings.

The fire collar may further comprise an interference between the shutters configured such that, in the activated configuration, the tension springs rests across the interference.

The biasing of the shutters towards the activated configuration allows the shutters to actively crimp the heat softened service conduit.

The fire collar may further comprise fuse means holding the shutters in the non-activated configuration such that, when the fire collar is exposed to heat on the activation side, the fuse means give, allowing the shutters to transition to the activated configuration.

The fuse means may comprise at least one fuse linkage bar holding the shutters apart under compression.

The fuse linkage bar may be configured to give above an activation temperature.

The material of the fuse linkage bar may be selected in accordance with the activation temperature.

The activation temperature may be above 100° C.

The material may comprise PVC.

The activation temperature may be above 200° C.

The material may comprise ABS.

The fuse linkage bar may comprise a line of weakness configured in accordance with the activation temperature.

The fuse linkage bar may be replaceable.

The fire collar may further comprise a further fuse linkage bar having a differing activation temperature.

The fuse means allows the fire collar to be activated at different temperatures depending on differing regulatory requirements and operational environments such as service conduit material type.

The fire collar may further comprise at least one tension spring tensioned between the shutters and wherein the fuse linkage bar may be in line with the at least one tension spring.

The tension spring being in line with the fuse linkage bar allows the shutters, tension springs and fuse linkage bar is to be removed as a mechanically stable integral unit so as to facilitate the manufacture, installation and regular servicing thereof without the need to remove the entire casing from the concrete.

The pivot points may be at least partially defined by fasteners extending through the casing and wherein the fire collar may further comprise covers covering exterior portions of the fasteners.

The shutters may be pivotally coupled to the casing at pivot points and the shutters may be orientated with the pivot points towards the installation side and the leading edges towards the activation side such that the shutters may tend to the activated configuration under the effects of gravity Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the fire collar are disclosed and described, it is to be understood that this disclosure is not limited to the particular configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

The accompanying illustrations show a fire collar 1. As will become apparent from the ensuing description, the fire collar 1 operates by way of shutter action wherein, briefly, referring to FIG. 3, there is shown a cross-sectional view of the fire collar 1 in a non-activated configuration whereas FIG. 4 shows the fire collar 1 in an activated configuration.

Figure 3:
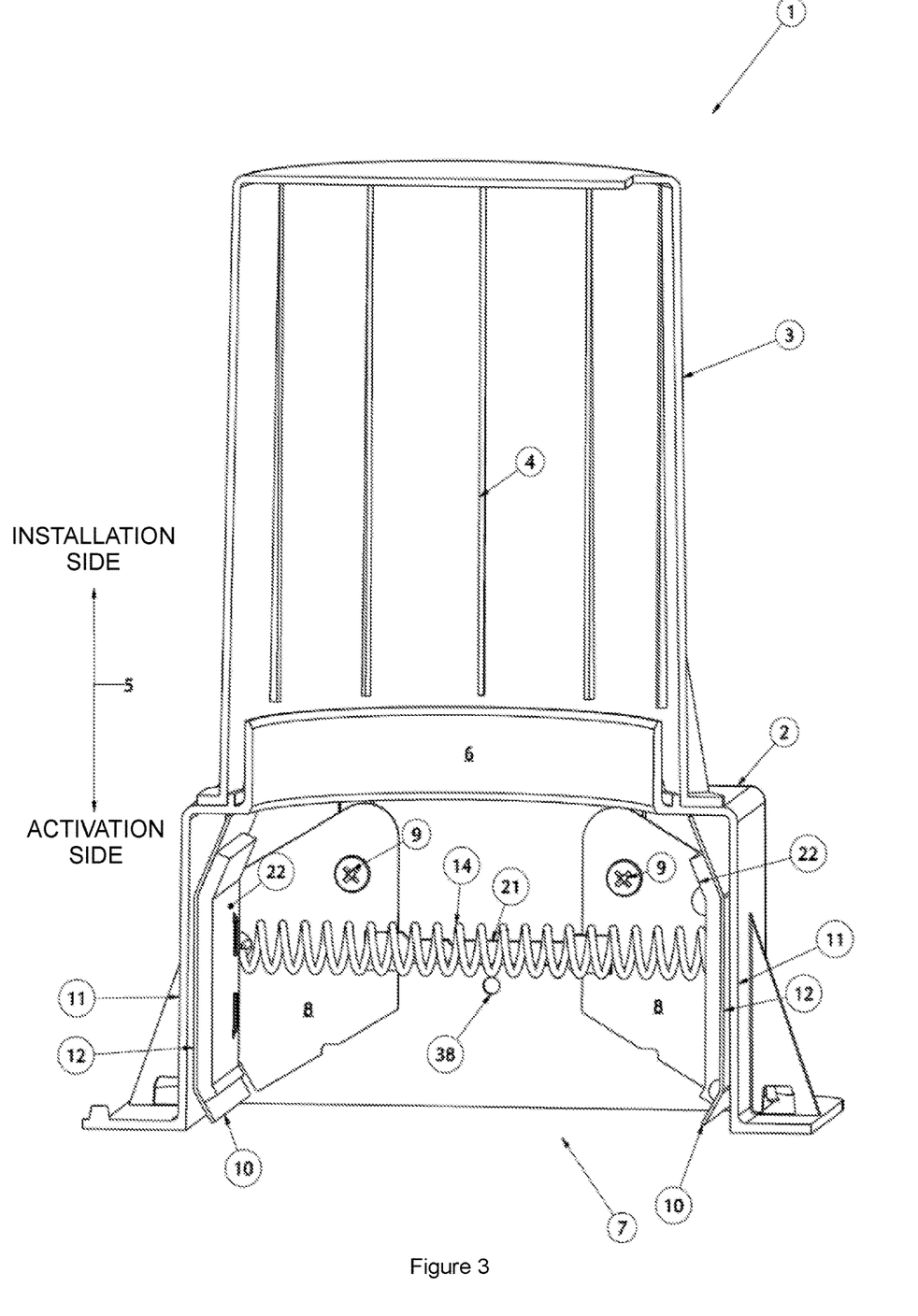
FIG. 3 shows a cross-sectional elevation view of the fire collar configured in a nonactivated configuration.
Figure 4:
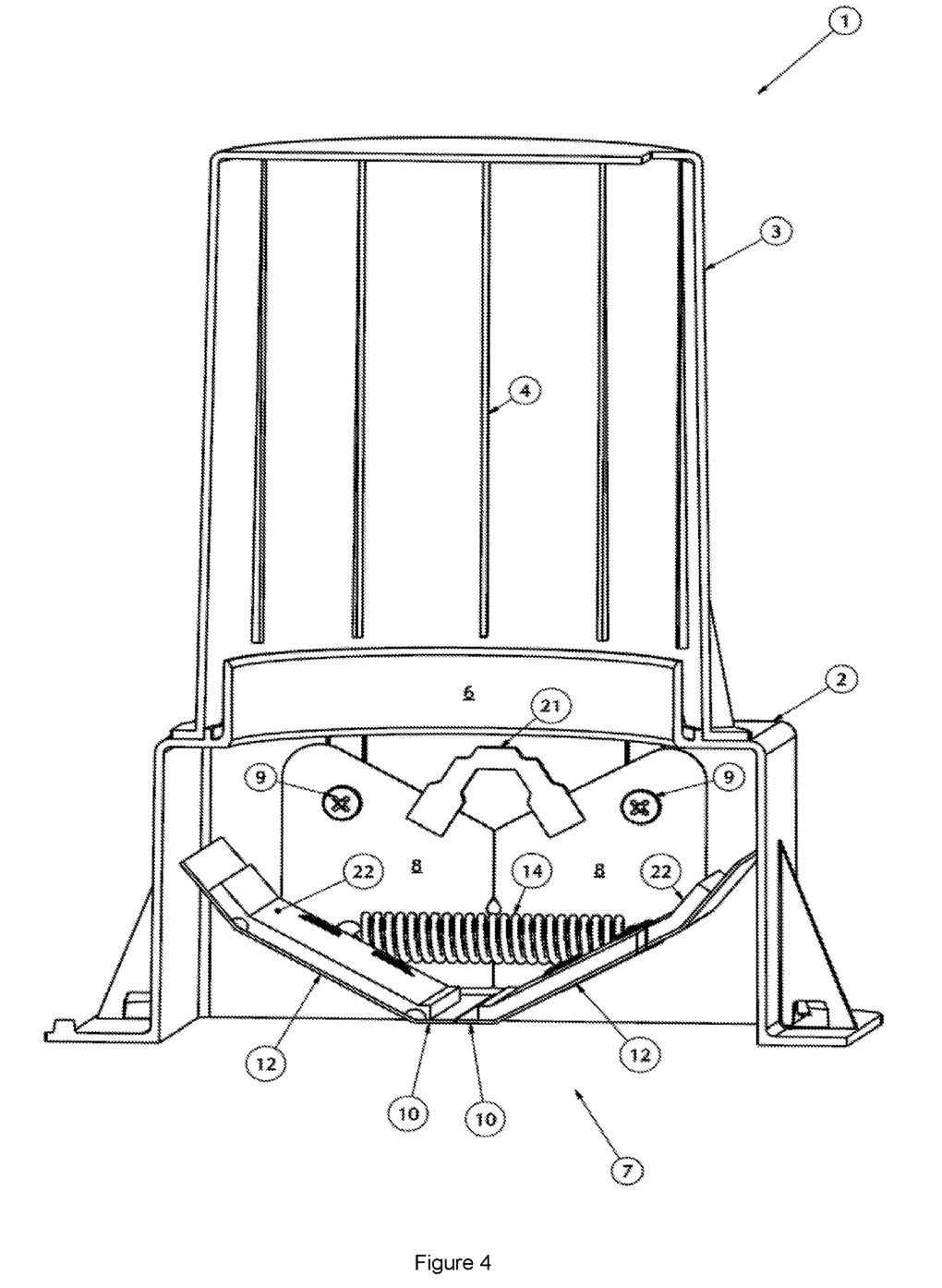
FIG. 4 shows a cross-sectional elevation view of the fire collar configured in an activated configuration.

Now, referring initially to FIGS. 3 and 4, the fire collar 1 comprises a casing 2. In the preferred embodiment shown, the casing 2 is configured for recessed installation wherein, for example, for concrete slab flooring, the fire collar 1 may be located prior to concrete pouring so as to allow the concrete to set around the fire collar 1. In this regard, in embodiments, the fire collar 1 may comprise an optional "hightop" installation conduit 3 having the cylindrical or frustoconical configuration as shown and extending upward from the casing 2. As such, once the concrete has been poured to a predetermined level, the installation conduit 3 may be cut at the exact height of the surface of the concrete.

As can be seen from the illustrations, the interior of the installation conduit 3 may be strengthened by way of ribbing 4. The ribbing may also allow for vertical and parallel keying for engaging an optional cap (not shown) at a variable height. In the embodiment shown, the installation conduit 3 is closed ended. Yet further, whereas the installation conduit 3 is shown as being separable from the casing in the accompanying illustrations, in embodiments, the installation conduit 3 and the casing 2 bay be integrally formed.

Figure 2:
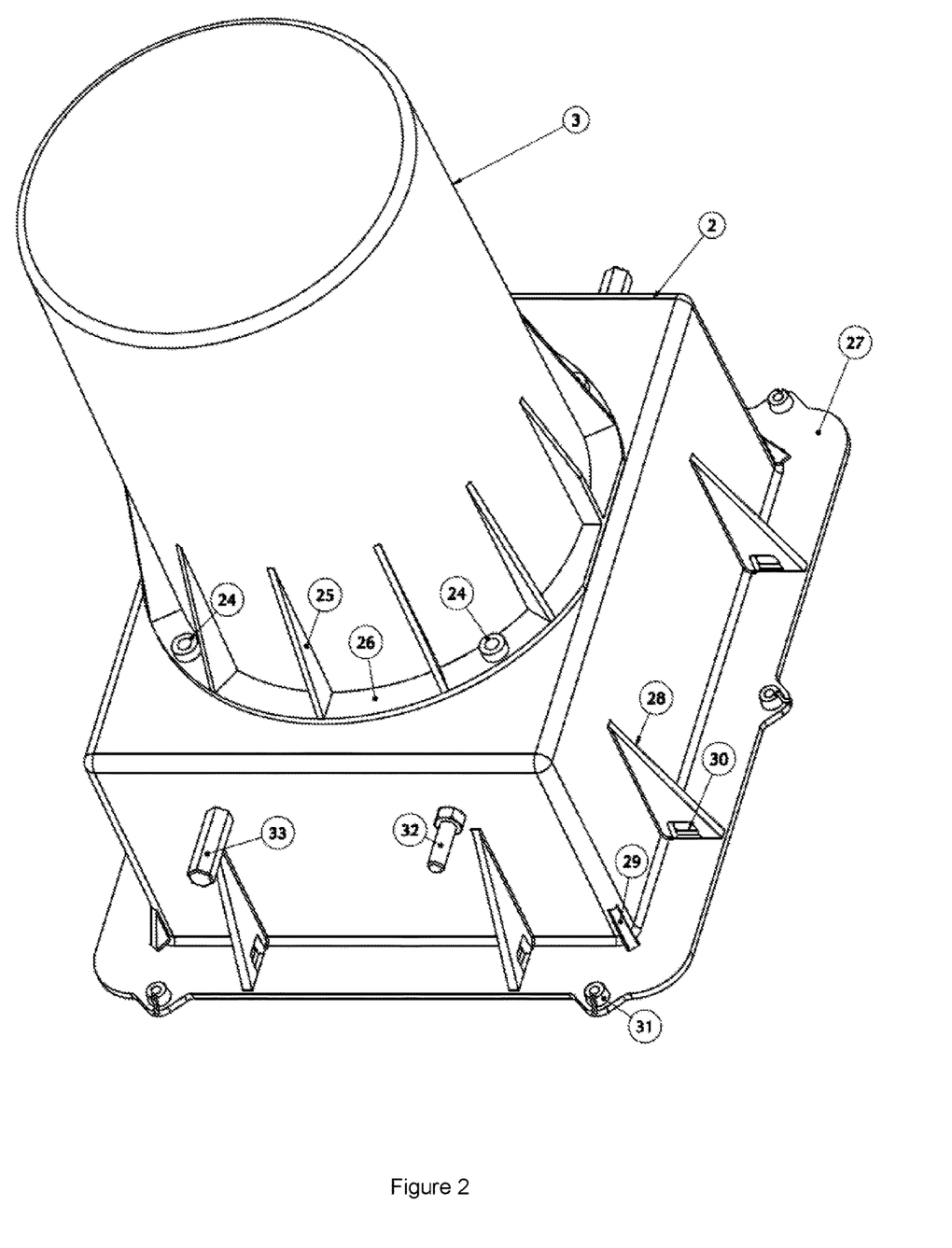
FIG. 2 shows an external upper perspective view of the fire collar.

Turning now to FIG. 2, there is shown the installation conduit 3 being removable from the casing 2 by way of installation conduit fasteners 24. As such, the installation conduit 3 may be selectively fastened to the casing 2 if required.

Figure 7:
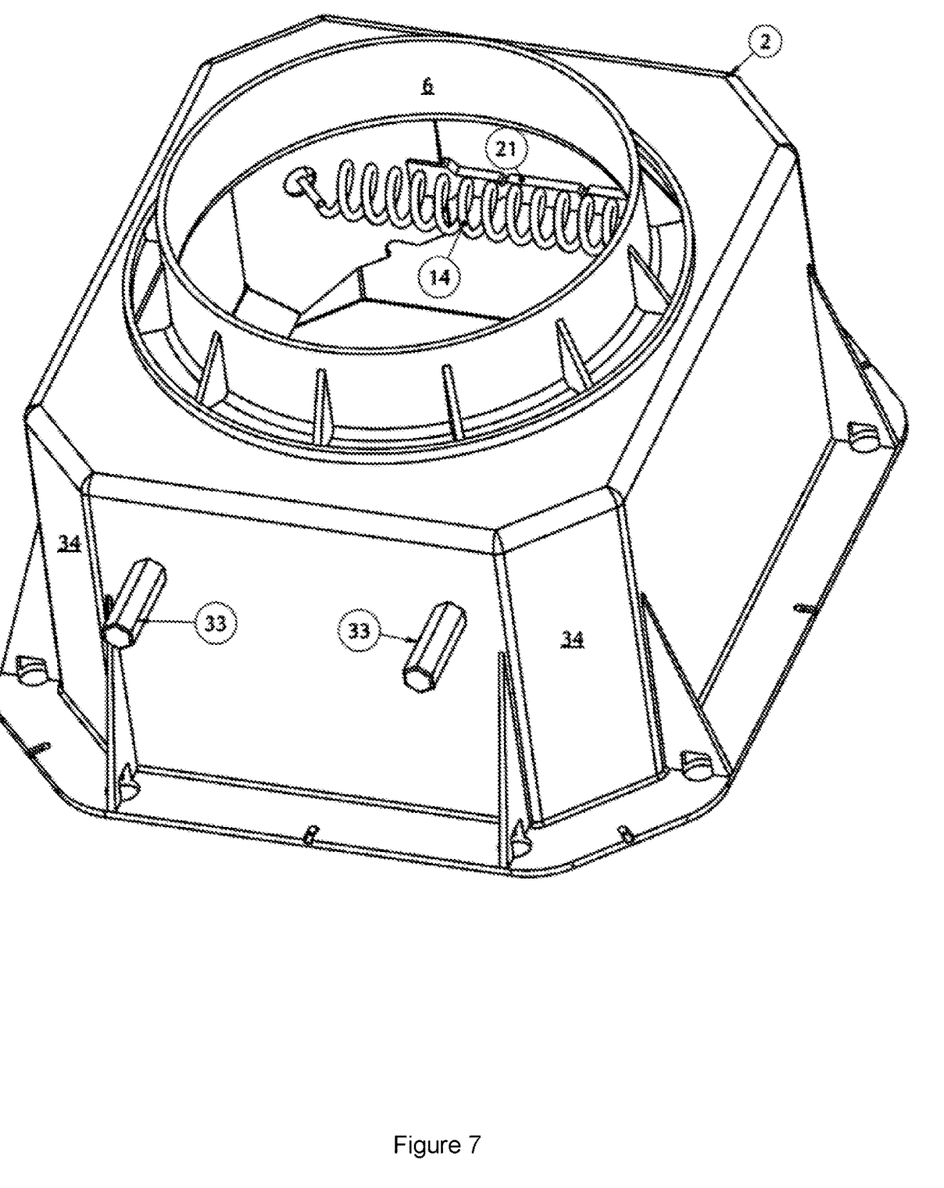
FIG. 7 shows an upper perspective view of the fire collar with the installation conduit having been removed.

FIG. 7 shows the fire collar 1 with the installation conduit 3 having been removed.

However, it should be noted that, in other embodiments, the casing 2 may, for example, be configured for non-recessed configuration for, for example, retrofit to already installed service conduiting.

Now, primarily for illustrative convenience, there is shown in FIG. 3 and orientational axis 5 defining the proposed orientation of the fire collar 1 in defining an installation side and an activation side. In this regard, where these sides are referenced subsequently in the description herein, the orientational axis 5 may be referenced.

In this regard, generally, the installation side may be construed as the side of the fire collar 1 which is installed towards the building member or material such as the flooring, wall, beam or the like in which the fire collar 1 is recessed or to which it is fastened. Opposite the installation side is the activation side defining the side of the fire collar 1 from which side the fire collar 1 is configured for protecting against heat in the event of a fire or the like.

Figure 1:
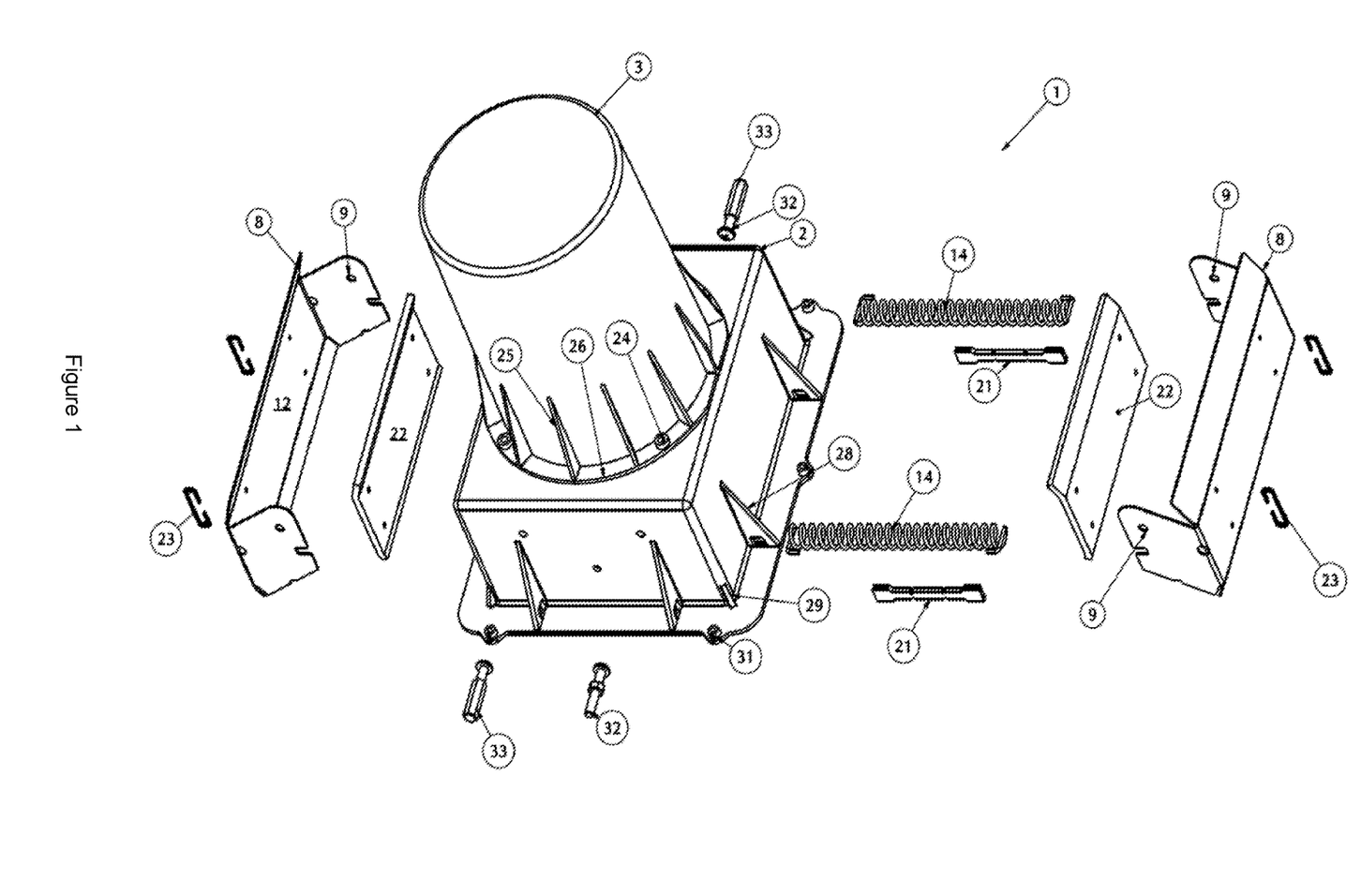
FIG. 1 shows an exploded view of a fire collar in accordance with a preferred embodiment of the present disclosure.

In most installations, the fire collar 1 would be installed in the vertical orientation substantially shown in FIG. 3 wherein the fire collar 1 is recessed into the underside of a floor slab such that the activation side is open from underneath the floor slab and whereas the installation conduit 3 protrudes from the top of the floor slab. However, as alluded to above, the fire collar 1 may be installed in other configurations such as by being orientated 90° with respect to the orientation shown in FIG. 1 wherein the fire collar 1 may be utilised for walls, beams and the like for horizontally penetrating service conduits. However, for brevity, the vertical orientation suited for vertically transitioning service conduits will be described herein.

Now, having established that the casing 2 defines an activation side and an installation side, as can be seen from at least FIG. 3, the casing 2 may define a conduit engagement 6 located towards the installation side of the casing 2. As can be seen, the conduit engagement 6 is generally circular so as to be suited for engaging a cylindrical service conduit passing therethrough. In this regard, differing fire collars 1 may be manufactured comprising conduit engagement having differing diameters suited for common conduit diameters. Ideally, the conduit engagement 6 is sized so as to smugly fit against the service conduit.

Now, the casing further defines an activation chamber 7. It should be noted that the nomenclature "activation chamber" as used herein primarily for illustrative convenience. As can be seen, the activation chamber 7 is located towards the activation side as opposed to the conduit engagement 6 which is located towards the installation side.

In this manner, the conduit engagement and the activation chamber 7 cooperate to define a service conduit passage therethrough for accommodating a service conduit (not shown) in use.

In embodiments, the casing 2 may be manufactured from plastic wherein, when recessed within concrete in the manner described above, the concrete assists as a heatsink so as to wick heat from the casing 2.

Now, as can be seen from FIG. 3, and as alluded to above, the fire collar 1 comprises an opposing pair of shutters 8 located within the activation chamber 7. The shutters 8 are pivotably coupled to the casing 2 at pivot points 9 so as to be able to pivot within the activation chamber 7 in the manner described herein.

In a preferred embodiment, the shutters 8 are manufactured from a fire resistant material, such as metal. In embodiment, the shutters 8 may be manufactured from stainless steel.

In this regard, the shutters 8 define substantially linear operative leading edges 10 which close against the service conduit when the fire shutter 1 activates in the manner described in further detail below.

As can be seen from FIG. 3, the shutters 8 are orientated such that the pivot points 9 are located towards the installation side whereas the operative leading edges 10 are located towards the activation side.

As such, in use, the opposing pair of shutters 8 are configurable in a non-activated configuration as substantially shown in FIG. 3 wherein the respective leading edges 10 are spaced apart so as to make allowance for the service conduit therebetween.

Furthermore, and turning to FIG. 4 now, when the fire collar 1 is exposed to heat on the activation side, the respective leading edges 10 of the shutters 8 close in so as to thereby close the passage as the service conduit softens and burns away. In embodiment as will be described in further detail below wherein the shutters 8 are biased together, the leading edges 10 may assist in crimping the heat softened service conduit closed.

In embodiments, and whereas the biasing of the shutters 8 together using a tensioning spring will be described in further detail below with reference to a preferred embodiment, the configuration of the shutter pivot points 9 may additionally or alternatively allow the shutters 8 to fall to the activated configuration under the effects of gravity.

In a particular embodiment, each shutter 8 may be balanced such that each shutter 8 rests hanging in the orientation of the activated configuration substantially shown in FIG. 4, that is, the centre of gravity of each shutter 8 is horizontally aligned with the pivot point 8 when in the activated configuration such that each shutter rests in the hanging orientation shown in FIG. 4.

As can be seen from the configuration of FIG. 3, the activation chamber 7 defines an open ended entrance providing spacing around the periphery of the service conduit located within the activation chamber 7 such that, when the fire collar is exposed to heat on the activation side, a substantial portion of the periphery of the service conduit located within the activation chamber is exposed to the heat. As such, during the event of a fire, the surrounding periphery of the service conduit would be exposed to heat so as to adequately degrade more quickly and allow the fire collar 1 to activate within the required time as opposed to were the periphery of the service conduit insulated by the fire collar or the surrounding concrete itself and being heated only by way of fire within the interior of the service conduit.

Furthermore, the orientation of the shutters 8 with the pivot points 9 towards the installation side and the leading edges towards the activation side 7 allow the leading edges 10 to meet the service conduit away from the surrounding concrete at the installation side, thereby preventing or ameliorating problems associated with thermal wicking which could delay the activation of the fire collar.

Now, in a preferred embodiment, the fire collar 1 may utilise intumescent material. Specifically, referring to FIG. 6, the fire collar 1 may comprise intumescent material pads 22 located on the inner faces of the shutters 8. For securement of the intumescent material pads 22, staples 23 may be provided.

Figure 6:
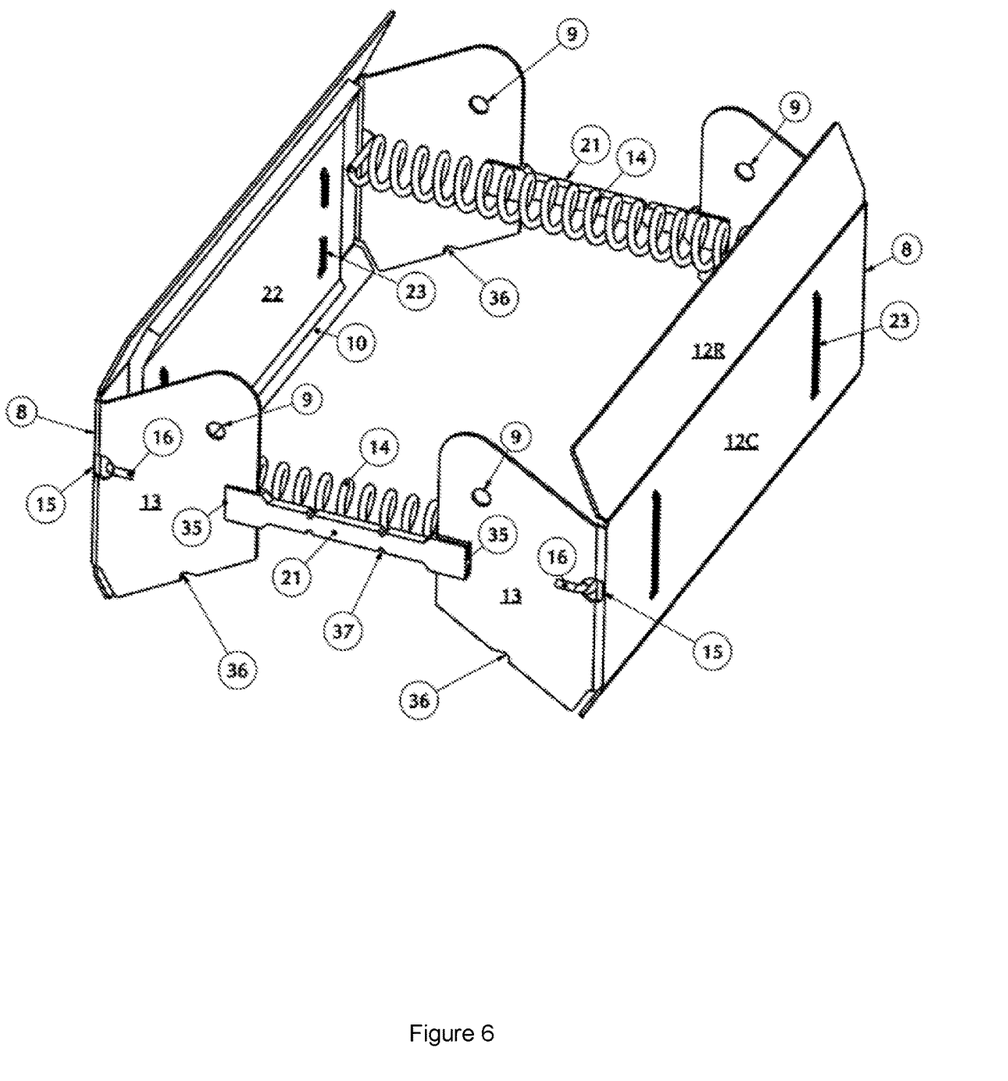
FIG. 6 shows shutter plates in accordance with a further embodiment of the present disclosure and further the inter-engagement of tensioning springs tensioned between the shutters and fuse linkage bars holding the shutter plates apart.

When the fire collar 1 is exposed to heat on the activation side, the intumescent material pads 20 to activate to form activated intumescent material.

Now, referring to FIG. 4 showing the fire collar 1 in the activated configuration, as can be appreciated, in this configuration, the activated intumescent material lies atop the shutters 8.

As such, the shutters 8 support the activated intumescent material so as to prevent or substantially ameliorate the activated intumescent material from falling from the activation chamber 7. Furthermore, the shutters 8 assist in shielding the activated intumescent material from convection air currents so as to prevent or ameliorate the activated intumescent material from being drafted up the service conduit.

Furthermore, and referring specifically to the configuration of the shutters 8 substantially shown in FIG. 6, as can be seen, the shutters 8 define central portions 12 and inwardly projecting wings 13 engaging the pivot points 9. By "inwardly", reference is made to FIG. 3 wherein, as can be seen, in the nonactivated configuration, the wings 13 project inwardly towards the interior of the activation chamber 7.

Now, with the activated intumescent material in mind, the particular configuration of the shutters 8 having the central portions 12 and the inwardly projecting wings 13 allow the central portions 12 to cradle the activated intumescent material.

Specifically, referring to FIG. 4, as can be seen, in the activated configuration, the central portions cradle the activated intumescent material.

In the embodiments shown, the intumescent material pads 22 fasten to the inner surfaces of the shutters. However, in other embodiments, intumescent material may be fastened to the roof of the activation chamber 7. In this configuration, the activated intumescent material would yet lie atop the shutters 8.

Referring specifically again to FIG. 6, as can be seen, the central portions 12 may have planar mid portions 12C. As can be seen, the projecting wings 13 may be substantially perpendicular to the mid portions 12C.

Furthermore, the central portions 12 may have a leading-edge portion 12L. As can be seen, the leading-edge portion 12L transitions inwardly including for reason so as to strengthen the leading-edge 12L. Specifically, the inward transition of the leading-edge 12L strengthens the leading-edge so as to avoid the "banana effect" from straight edges meeting the service conduit at an oblique angle and splay apart.

Furthermore, in embodiments, the inward transition of the leading-edge 12L allows the respective leading edges 10 to meet face on and parallel as a substantially shown in FIG. 4, allowing for effective crimping of the service conduit and avoiding meeting the service conduit at an angle which may cause the leading edges 10 display apart. In alternative embodiments, the leading edges 12L need not necessarily meet in parallel, wherein the transition is greater allowing the leading edges 12L to meet rather at an upward angle, the latter being found by trial end experimentation by the inventor as further assisting the structural rigidity of the leading edges 12L.

Furthermore, the central portions 12 may define trailing portions 12R. Similarly, the trailing portions 12R may also transition inwardly. Specifically, referring to FIG. 3, as can be seen the inward transition of the trailing portions 12R allows the trailing portions 12R to transition past the adjacent inner walls of the activation chamber 7 as the shutters 8 pivot about the pivot points 9.

Now, referring again to FIG. 3, as can be seen, the projecting wings 13 may be configured such that the pivot points 9 are located closer to the trailing portions 12R as opposed to the leading-edge portions 12L.

Furthermore, the activation chamber defines a height, and, in embodiments, the central portions 12 are configured such that, in the nonactivated configuration shown in FIG. 3, the central portions 12 occupy most of the height of the activation chamber.

As such, as can be appreciated, such configuration allows for a compact configuration in allowing the shutters 8 to effectively utilise the interior spacing of the activation chamber 7.

Specifically, in a preferred embodiment, the activation chamber 7 defines a rectangular cross-section (such as a square, including with corners cut out as substantially shown in FIG. 7) wherein, the projecting wings 13 lie against first opposing inner surfaces of the activation chamber and furthermore, in the nonactivated configuration shown in FIG. 3, the mid portions 12C lie against second opposing inner surfaces of the activation chamber.

The rectangular cross-section of the casing 2 aids in the installation of the fire collar 1 wherein certain floor slab formwork installations comprise a metal base which must be physically cut from beneath to allow access to the fire collar. The square cross-section of the casing 2 allows the appropriate aperture to be cut through utilising straightedge cutters, such as angle grinders without having to utilise expensive plasma cutters or the like to cut curves.

Now, in a preferred embodiment, the fire collar 1 comprises shutter biasing means to bias the shutters 8 to the activated configuration.

Specifically, referring to FIG. 6, the biasing means may comprise at least one tension spring 14 tension between the shutters 8.

In a particular embodiment shown, the fire collar 1 comprises two tension springs 14.

Furthermore, in the embodiment shown in FIG. 6, the tension springs 14 connects to the shutters 8 at a juncture between the central portions 12 and the wings 13.

In this particular configuration, the tension springs 14 may be shielded from heat when the shutters 8 assume the activated configuration so as to reduce the likelihood of the springs 14 failing in high temperatures.

Figure 8:
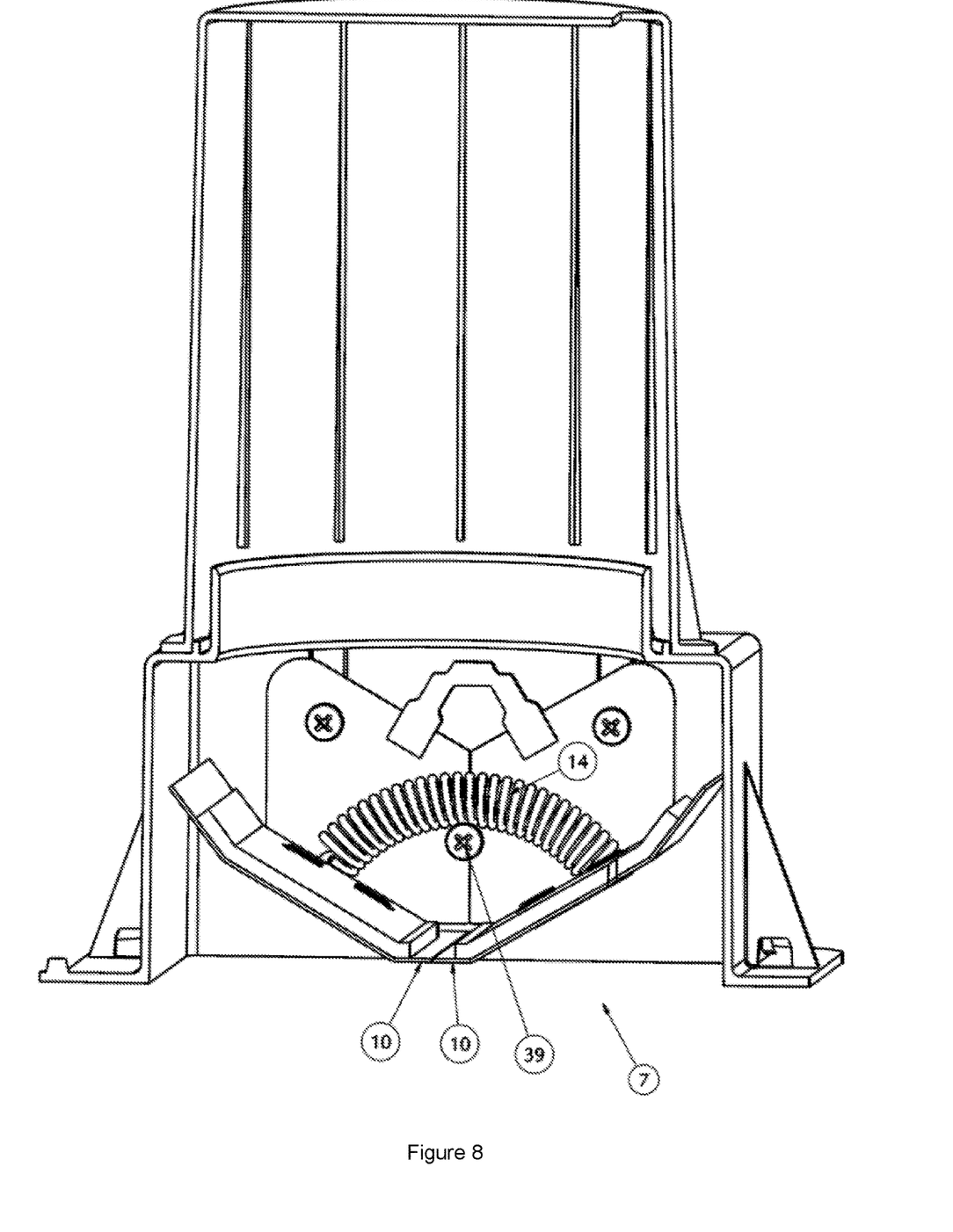
FIG. 8 shows a cross-sectional elevation view of the fire collar in accordance with a further embodiment wherein the fire collar comprises an interference between the shutter plates such that, in the activated configuration shown, the tensioning spring lies across the interference.

Furthermore, the fire collar 1 may comprise interferences 39 projecting inwardly between the shutters 8. As can be seen from the embodiment shown in FIG. 8 showing the shutters 8 in the activated configuration, the tension springs 14 lie atop the interference 39 so as to hold the tension springs 14 away from the closing leading-edges 10. At least FIG. 6 shows the shutters 8 having cutouts 36 for making allowance for the interferences 39. Furthermore, FIG. 3 shows the casing 2 having apertures 38 in which the interferences 39 may be secured.

In embodiment, the tensioning springs 14 may be manufactured from stainless steel.

In another embodiment, other types of springs may be utilised such as torsion springs. Specifically, such a torsion spring may define dual torsion coils from which arms extend, terminating in inwardly projecting projections configured for engaging the shutter plates 8.

Now, in a preferred embodiment, the fire collar 1 further comprises fuse means holding the shutters 8 in the nonactivated configuration such that, when the fire collar 1 is exposed to heat on the activation site, the fuse means give, allowing the shutters 8 to transition to the activated configuration.

Now, referring to FIG. 6, in the embodiment shown, the fuse means comprises at least one fuse linkage bar 21 holding the shutters 8 apart under compression.

In embodiment shown in FIG. 6, the fire collar 1 comprises a pair of fuse linkage bars 21 located at either ends of the shutters. Specifically, as can be seen, each fuse linkage bar 21 may comprise end engagements 35 which may be configured for fastening to corresponding engagements 34 (shown in FIG. 5) of the inner edge of the wings 13.

As such, when exposed to heat within the activation chamber 7, the fuse linkage bars 21 give such as is substantially shown in FIG. 4 allowing the shutters 8 to assume the activated configuration.

In embodiment, the fuse linkage bar 21 may be selected in accordance with an activation temperature.

For example, for PVC service conduit application, the fuse linkage bar 21 may be configured to give at above approximately 100° C. However, for more modern polypropylene piping, the fuse linkage bar 21 may be configured to give at above approximately 200° C.

In embodiments, the particular material may be chosen so as to confer the desired activation temperature on the fuse linkage bar 21. For example, in one embodiment, the fuse linkage by 21 may be manufactured from the same or similar material as that of the service conduit such that, wherein, for PVC service conduits, the fuse linkage bars 21 may similarly be manufactured from PVC so as to give at a same or similar temperature.

In alternative embodiments, the fuse linkage bar 21 may comprise at least one line of weakness 37 wherein the line of weakness 37 is configured to allow the fuse linkage bar 21 to give at the activation temperature. The fuse linkage bars 21 may also have standoffs for spacing an air gap between the fuse linkage bars 21 and the casing 2 so as to reduce thermal wicking from the fuse linkage bars 21 to the casing 2 and surrounding concrete which could otherwise affect the activation of the fuse linkage bars 21.

In embodiments, differing types of fuse linkage bars 21 may be provided for the fire collar 1 so as to be suited for differing applications wherein, during installation, the installer may select the appropriate fire collar 1 depending on the material of the service conduit or the like.

Now, in a further preferred embodiment, as can be seen at least from FIG. 6, the fuse linkage bar 21 is in line with the associated tensioning spring 14. Such configuration provides for a mechanically stable shutter configuration assisting in the manufacture, installation and servicing of the shutters 8.

Specifically, AS 1851 requires regular inspection and servicing of passive fire systems.

As such, the in-line configuration of the fuse bars 21 and the tensioning springs 14 provides a mechanically stable standalone shutter configuration which can be removed while the casing 2 remains in place.

Specifically, for their replacement, the screws located at the pivot points 9 may be unscrewed and the shutters 8 removed.

Turning now to FIG. 2, the installation conduit 3 may comprise a flange 26 and supporting buttresses 25. As alluded to above, when poured in concrete, the buttresses 25 may key into the set concrete.

Furthermore, as can be seen also, the casing 2 may itself comprise a flange 27 and supporting buttresses wherein the supporting buttresses 28 may further comprise a minor buttresses 29. The buttresses 28 may further comprise cutouts 30 so as to allow the concrete to set therein for further keying.

Furthermore, the flange 27 may comprise fastener apertures 31 for fastening the casing 2 to formwork or the like during installation.

As can also be seen from FIG. 2, the pivot points 9 may be formed by fasteners 32 projecting from the interior of the casing 2 to the exterior of the casing 2. In this regard, each faster 32 may comprise a sleeve 33 so as to prevent the fastener 32 from being keyed into the concrete so as to allow for the replacement of the shutters 8 in the manner described above.

Figure 5:
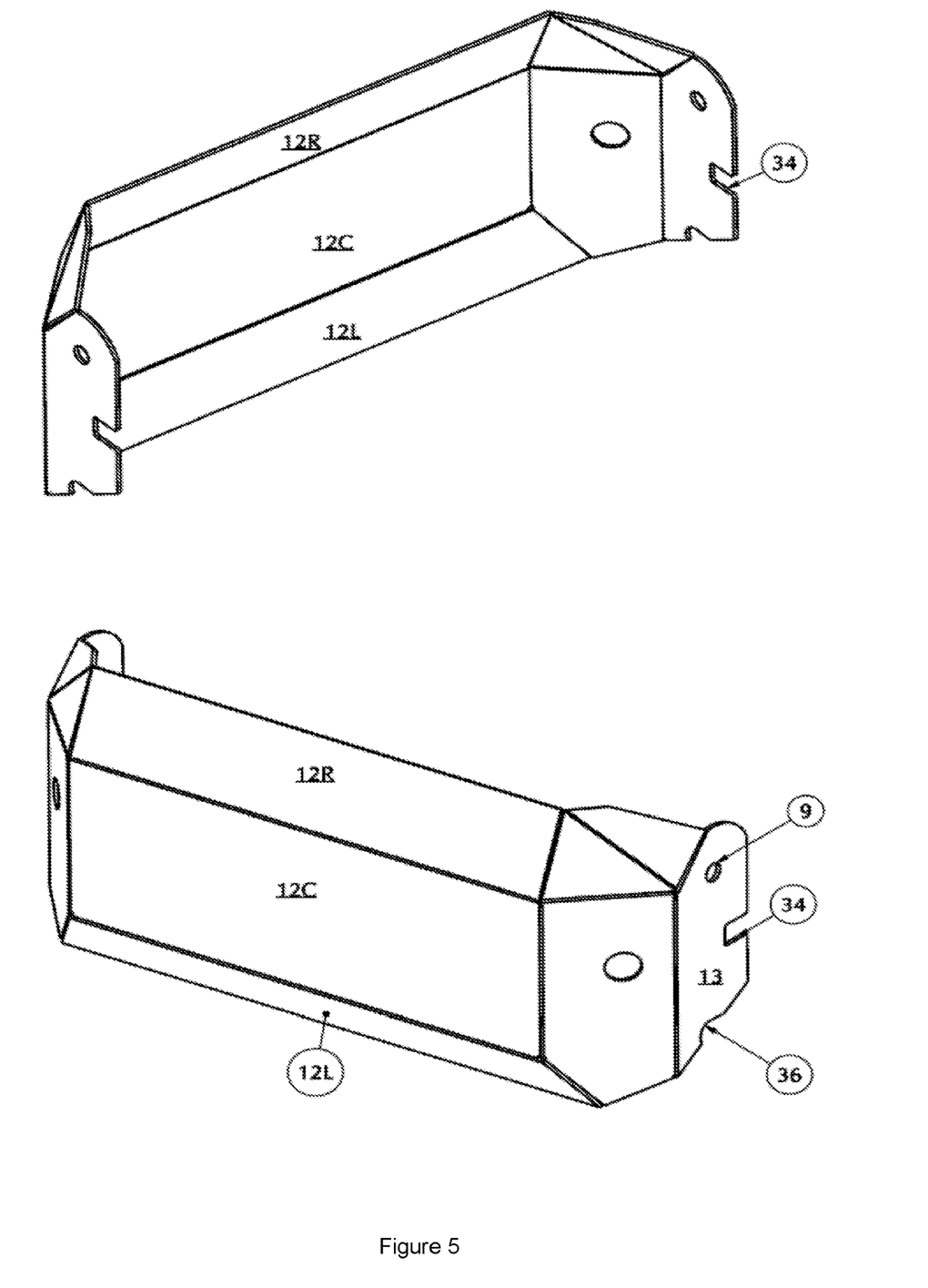
FIG. 5 shows shutter plates in accordance with an embodiment of the present disclosure.

Turning now to FIG. 5, there is shown a variation of the configuration of the shutters 8 wherein, as can be seen, the juncture between the wings 13 and the central plate portions 12 are cornered.

INTERPRETATION

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the building industries.

The invention claimed is:
1. A fire collar comprising:
   a casing defining a service conduit passage therethrough, the casing having an activation side and an installation side, wherein the casing defines an activation side located activation chamber;
   an opposing pair of shutters located within the activation chamber defining operative leading edges such that, in use:
      the shutters are configurable in a non-activated configuration wherein the leading edges are spaced apart so as to make allowance for the service conduit therebetween; and
      when the fire collar is exposed to heat on the activation side in use, the shutters transition to an activated configuration wherein the respective leading edges of the shutters close in to close the passage, wherein:
         the shutters are pivotally coupled to the casing at pivot points and wherein the shutters are orientated with the pivot points towards the installation side and the leading edges towards the activation side;
         the shutters are biased together; and
         the activation chamber defines an open ended entrance providing spacing around the periphery of the service conduit located within the activation chamber between the leading edges of the shutters in use such that, when the fire collar is exposed to heat on the activation side in use, a substantial portion of the periphery of the service conduit located within the activation chamber between the leading edges of the shutters is exposed to the heat.

2. A fire collar as claimed in claim 1, further comprising intumescent material located within the activation chamber, such that, when the fire collar is exposed to heat on the activation side, the intumescent material forms activated intumescent material and wherein the activated intumescent material collects on top of the shutters in the activated configuration.

3. A fire collar as claimed in claim 2, wherein the intumescent material comprises a pair of intumescent material pads fastened to respective inner surfaces of the shutters.

4. A fire collar as claimed in claim 2, wherein the shutters define central portions and inwardly projecting wings engaging pivot points such that, in the activated configuration, the central portions cradle the activated intumescent material.

5. A fire collar as claimed in claim 4, wherein the central portions have planar mid portions.

6. A fire collar as claimed in claim 5, wherein the projecting wings are substantially perpendicular to the mid portions.

7. A fire collar as claimed in claim 5, wherein the central portions have leading edge portions.

8. A fire collar as claimed in claim 7, wherein the leading edge portions transition inwardly.

9. A fire collar as claimed in claim 5, wherein the central portions have trailing edge portions.

10. A fire collar as claimed in claim 9, wherein the leading trailing portions transition inwardly.

11. A fire collar as claimed in claim 4, wherein the inwardly projecting wings engage the pivot points such that the pivot points are closer to the trailing portions as opposed to the leading edge portions.

12. A fire collar as claimed in claim 4, wherein the activation chamber defines a height and wherein the central portions are configured, such that, in the non-activated configuration, the central portions occupy most of the height.

13. A fire collar as claimed in claim 1, wherein the activation chamber defines a rectangular cross-section and wherein the projecting wings lie against first opposing inner surfaces of the activation chamber and wherein, in the non-activated configuration, the mid portions lie against second opposing inner surfaces of the activation chamber.

14. A fire collar as claimed in claim 1, further comprising shutter biasing means to bias the shutters to the activated configuration.

15. A fire collar as claimed in claim 14, wherein the biasing means comprises at least one tension spring tensioned between the shutters.

16. A fire collar as claimed in claim 15, wherein the shutters define a central portions and inwardly projecting wings and wherein the at least one tension spring comprises two tension springs engaging the shutters at respective junctures between the central portions and inwardly projecting wings.

17. A fire collar as claimed in claim 16, wherein the at least one tension spring are located inward of the inwardly projecting wings.

18. A fire collar as claimed in claim 16, further comprising an interference between the shutters configured such that, in the activated configuration, the tension springs rests across the interference.

19. A fire collar as claimed in claim 1, further comprising fuse means holding the shutters in the non-activated configuration such that, when the fire collar is exposed to heat on the activation side, the fuse means give, allowing the shutters to transition to the activated configuration.

20. A fire collar as claimed in claim 19, wherein the fuse means comprises at least one fuse linkage bar holding the shutters apart under compression.

21. A fire collar as claimed in claim 20, wherein the fuse linkage bar is configured to give above an activation temperature.

22. A fire collar as claimed in claim 21, wherein the fuse linkage bar comprises a line of weakness configured in accordance with the activation temperature.

23. A fire collar as claimed in claim 22, wherein the fuse linkage bar comprises standoffs for spacing an air gap between the fuse linkage bar and adjacent casing of the fire collar.

24. A fire collar as claimed in claim 21, wherein the fuse linkage bar is replaceable.

25. A fire collar as claimed in claim 1, wherein the pivot points are at least partially defined by fasteners extending through the casing and wherein the fire collar further comprises covers covering exterior portions of the fasteners.

26. A fire collar as claimed in claim 1, wherein the shutters are pivotally coupled to the casing at pivot points and wherein the shutters are orientated with the pivot points towards the installation side and the leading edges towards the activation side such that the shutters tend to the activated configuration under the effects of gravity.

* * * * *